(12) United States Patent
Binnig

(10) Patent No.: US 7,401,503 B2
(45) Date of Patent: Jul. 22, 2008

(54) METHOD FOR ANALYSIS THROUGH LAYER-BY-LAYER SAMPLE REMOVAL USING A CANTILEVER PROBE

(75) Inventor: Gerd K. Binnig, Wollerau (CH)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 11/567,868

(22) Filed: Dec. 7, 2006

(65) Prior Publication Data

US 2007/0125159 A1 Jun. 7, 2007

(30) Foreign Application Priority Data

Dec. 7, 2005 (EP) .................... 05111775

(51) Int. Cl.
*G01B 5/28* (2006.01)
*B26D 1/00* (2006.01)
(52) U.S. Cl. ........................ 73/105; 83/915.5
(58) Field of Classification Search ............ 73/105; 83/915.5

See application file for complete search history.

(56) References Cited

U.S. PATENT DOCUMENTS

| 3,440,913 | A | * | 4/1969 | Persidsky et al. | ............. 83/422 |
| 5,282,404 | A | * | 2/1994 | Leighton et al. | ............... 83/13 |
| 5,410,910 | A | * | 5/1995 | Yang et al. | ..................... 73/105 |
| 6,546,788 | B2 | * | 4/2003 | Magerle | ....................... 73/105 |
| 6,635,870 | B1 | * | 10/2003 | Pachuta et al. | ............... 250/306 |
| 6,923,044 | B1 | * | 8/2005 | Kley | ............................ 73/105 |
| 2002/0125427 | A1 | * | 9/2002 | Chand et al. | ................ 250/306 |

* cited by examiner

*Primary Examiner*—Michael Cygan
(74) *Attorney, Agent, or Firm*—Ido Tuchman; Lisa M. Yamonaco

(57) ABSTRACT

A method and apparatus for analysis of a sample. The method includes an accessing operation for accessing a region of the sample via a tip of at least one probe mounted on a cantilever. A removing operation removes a sample material from the region that is accessed by the tip of the at least one probe mounted on the cantilever. A sensing operation senses a parameter associated to the removal of the sample material in the removing operation. The accessing, removing, and sensing operations are repeated to facilitate removal of at least one layer of the sample.

1 Claim, 1 Drawing Sheet

METHOD FOR ANALYSIS THROUGH LAYER-BY-LAYER SAMPLE REMOVAL USING A CANTILEVER PROBE

CROSS-REFERENCE TO RELATED APPLICATIONS

This application claims priority under 35 U.S.C. § 119 to European Patent Application No. 05111775.2 filed Dec. 7, 2005, the entire text of which is specifically incorporated by reference herein.

BACKGROUND OF THE INVENTION

The present invention relates to a method for analysis of a sample. More particularly, the present invention relates to a method for three-dimensional analysis of a sample. The present invention also extends to an analyzer for analysis of a sample.

With the advent of scanning probe techniques such as the scanning tunneling microscope STM and the atomic force microscope AFM, it has become possible to image a wide variety of samples with a resolution capability on the molecular or atomic scale.

An AFM image of a sample may be collected by mapping the deflection of a cantilever-mounted probe as a function of the x-y position of the tip of the probe on the sample when the tip comes into contact with, or is in close proximity to, the sample whilst being scanned relative thereto. This yields a topographic image of the sample surface. However, should the sample have an undercut region or steep wall, only the height change and not the profile thereof is accessible by the tip so that the image obtained will not depict the true shape of the sample.

The aforementioned problem has been addressed in an article by Wickramasinghe et. al in Applied Physics Letters, Volume 64(19), published 9 May 1994, pages 2498 to 2500, titled, "Method for imaging sidewalls by atomic force microscopy". A two-dimensional (2D) AFM is described in this article specifically designed to image samples with vertical profiles. This design involves: (i) the use of a modified tip, specifically, a cylindrical tip fabricated so as to have lower protrusions giving it a "boot" shape; (ii) vibration of the tip in the vertical Z direction and horizontal X direction, (iii) a two-dimensional scan and servo system, and (iv) a mode of acquisition of data points that is different from what is used for conventional AFM imaging.

The method proposed by Wickramasinghe et. al may be applicable to imaging biological samples such as cells, which, not only have vertical edges, typically, for example, at cell boundaries, but also have irregular surfaces. Even so, this method would only yield the possibility of performing a two-dimensional analysis of the profile of such a sample.

Accordingly, it is desirable to provide a method capable of performing a three-dimensional analysis of a sample, particularly a biological sample, which has the atomic/molecular resolution capability of AFM whilst retaining simplicity of design, i.e. not requiring the use of specialized tips, servo- and scanning systems, for example.

BRIEF SUMMARY OF THE INVENTION

According to an embodiment according to a first aspect of the present invention, there is provided a method for analysis of a sample including the steps of: (i) accessing a region of the sample via a tip of at least one probe mounted on a cantilever; (ii) removing a sample material from the region that is accessed by the tip of the at least one probe mounted on the cantilever; and (iii) sensing a parameter associated to the removal of the sample material in step (ii), wherein steps (i) to (iii) are repeated to facilitate removal of at least one layer of the sample.

In a step (i), a tip of a cantilever-mounted probe is brought into contact with a surface of a sample of interest so that the tip accesses a region of the sample. In a step (ii), the sample material is removed from the region where the tip has accessed the sample. In a step (iii), removal of the sample material is sensed using at least one sensor. A sensing signal produced by the sensor provides information on, for example, the character and/or strength with which the sample material is removed. Steps (i) to (iii) are repeated for the tip being scanned across the sample so that a whole layer of the sample is removed. By collecting the sensing signal produced by the sensor at each scan point of the tip on the sample, a map of the profile of the sample can be obtained.

According to an embodiment of the first aspect, steps (i) to (iii) are repeated to facilitate removal of at least another layer of the sample.

The above-described process is repeated for the removal of subsequent layers of the sample. Combining the measurements performed above for all the layers of the sample that are removed yields a three-dimensional image of the sample. The possibility of obtaining three-dimensional information is advantageous in certain fields, especially in the biological field where three-dimensional information of biological systems may be used in, for example, drug discovery and to provide an insight into the dynamics of such systems.

According to an embodiment of the first aspect, the sample material that is removed in step (ii) from the region that is accessed by the tip of the at least one probe mounted on the cantilever is one of an atom of the sample and a molecule of the sample.

The tip of the cantilever-mounted probe can, for example, be of the type used for conventional AFM imaging. Such a tip can be used for accessing a localized region of the sample, such as, for example, an atom or molecule of the sample, which is then treated to facilitate the removal of sample material from that region.

According to an embodiment of the first aspect, there is further provided a step of removing debris from a surface of the sample, the debris resulting from the removal of the sample material in step (ii) from the region that is accessed by the tip of the at least one probe mounted on the cantilever.

It could be that removal of the sample material in step (ii) results in some debris on the surface thereof. In order that the debris does not interfere with, for example, scanning of the tip to other points on the sample and/or sensing of a parameter associated to the removal of the sample material, it is desirable to remove the debris. Any appropriate device and/or method may be used for removing the debris off the sample surface. An example of a device that may be used is a specially-fabricated miniature fan.

According to an embodiment of the first aspect, in step (iii), sensing of the parameter associated to the removal of the sample material is selected to be done by an integrated sensor that is integrated into the cantilever onto which the at least one probe is mounted. In this case, the integrated sensor may comprise one of: a vibration sensor, a charge sensor, a temperature sensor and a combination of a vibration sensor, a charge sensor and a temperature sensor.

Sensing of the parameter associated to the removal of the sample material in step (iii) can, for example, be done by measuring a parameter of the cantilever onto which the probe is mounted and/or a parameter of the sample. Where a parameter of the cantilever is sensed, the corresponding sensor may be integrated into the cantilever for ease of implementation. In this case, the integrated sensor may be a vibration sensor to detect a change in vibration of the cantilever in response to the removal of the sample material, a charge sensor to detect a change in a charge, for example, a surface charge, of the cantilever in response to the removal of the sample material, a temperature sensor in order to detect a change in temperature of the cantilever in response to the removal of the sample material or a combination of a vibration sensor, charge sensor and a temperature sensor. An advantage associated to the use of the combination is that the sensing signal of the sensor, which has a higher magnitude out of all the sensing signals that are produced by the sensors in the combination, may be used. A further advantage is that, if one of the sensors is not functioning, then the other sensors in the combination may be used.

According to an embodiment of the first aspect, in step (iii), sensing of the parameter associated to the removal of the sample material is selected to be done by an external sensor. In this case, the external sensor comprises one of: a pressure sensor, a smell sensor, a mass-spectrometer and a combination of a pressure sensor, a smell sensor and a mass-spectrometer.

As discussed above, sensing of the parameter associated to the removal of the sample material in step (iii) can be done by measuring a parameter of the cantilever onto which the probe is mounted and/or a parameter of the sample. Measuring a parameter of the sample can be done via an external sensor, which could be a smell sensor for sensing the smell associated to the gaseous phase of the sample once it is removed by, for example, heating, a mass-spectrometer, a pressure sensor for operation in a vacuum or a combination of a pressure sensor, a smell sensor and a mass-spectrometer. The advantages associated to the use of the combination correspond to those stated for the use of a combination of sensors for the integrated sensor.

According to an embodiment of the first aspect, in step (iii), sensing of the parameter associated to the removal of the sample material is selected to be done by measuring a deflection of the cantilever onto which at the least one probe is mounted.

The removal of the sample material in step (ii) may be monitored by measuring a mechanical response of the cantilever, for example, via a deflection of the cantilever. The cantilever deflection can, for example, be measured by directing a laser beam on its surface disposed opposite to that on which the probe is mounted and monitoring the displacement of the reflected laser beam on a quadrature-segmented photodiode.

According to an embodiment of the first aspect, removal of the sample material in step (ii) from the region that is accessed by the tip of the at least one probe mounted on the cantilever is selected to be done by heat applied to the tip of the at least one probe mounted on the cantilever. The heat applied to the tip of the at least one probe mounted on the cantilever may be selected to be done by an integrated heater that is integrated into the cantilever onto which the at least one probe is mounted. In this case, in step (iii), sensing of the parameter associated to the removal of the sample material may be done by measuring the temperature of the integrated heater.

In step (ii), removal of the sample material from the region that is accessed by the tip can be done heating the tip. The sample material is, in this case, "burnt off" or fragmented into a gaseous phase due to the energy transfer from the hot tip. For ease of implementation, heat can be applied to the tip via a heater that is integrated into the cantilever onto which the probe associated to that tip is mounted. In order to supplement the measurements obtained from the aforementioned internal sensor and external sensor, removal of the sample material can be sensed by the change in temperature this causes in the integrated heater.

According to an embodiment of the first aspect, the at least one layer of the sample is removed via a predetermined number of steps, the heat applied to the tip of the at least one probe mounted on the cantilever being increased at each step relative to the previous step until the predetermined number of steps are completed. In this case, a spring constant value of the cantilever onto which the at least one probe is mounted is switched to another spring constant value before the at least another layer of the sample is removed.

Where removal of the sample material is effected by application of heat via the tip of the cantilever-mounted probe, the heat being applied to the tip, for example, via the integrated heater, the removal of a layer of the sample material may be done via a predetermined number of steps. These steps may be defined by the number of scan points for scanning the tip relative to the sample. In this case, the heat applied to the tip could be configured to increase with each scan point as it may be that some regions of the sample may require more heat than others for removal thereof. Before removal of the next layer in the above-described manner, a spring constant of the cantilever may be switched to another value. By simultaneously repeating the above-described heat treatment and, for example, measuring the cantilever deflection at each scan point for each of the spring constant values of the cantilever, additional information on the removal process of the sample material can be obtained.

According to an embodiment of the first aspect, in step (iii), sensing of the parameter associated to the removal of the sample material is selected to be done by a combination of the integrated sensor, the external sensor, measuring the deflection of the cantilever onto which the at least one probe is mounted and measuring the temperature of the integrated heater By using a combination of the integrated sensor, the external sensor, measuring the deflection of the cantilever onto which the at least one probe is mounted and measuring the temperature of the integrated heater to sense a parameter associated to the removal of the sample material, the sensitivity of the measurements can be increased. Furthermore, if one of the sensors malfunctions, the other sensors in the combination can be relied upon.

According to an embodiment of the first aspect, the sample is a biological sample. In this case, the biological sample is frozen prior to step (i) being performed.

As discussed earlier, the possibility of obtaining three-dimensional information is advantageous in certain fields, especially in the biological field where three-dimensional information of biological systems may be used in, for example, drug discovery and to provide an insight into the dynamics of such systems. Here, a three-dimensional analysis of a biological system such as, for example, a cell may be performed with molecular or atomic resolution. The possibility of performing the three-dimensional analysis with the resolution capability of, for example, an AFM is considered to outweigh the fact that a cell that is being so analyzed will be destroyed due to cellular material being destroyed at each point of contact of by the tip. Where the sample to be analyzed is a biological sample, it is preferably frozen prior to performing the analysis for ease of accessing a region on it by the tip and also so that a specialized servo-system is not required, which would be the case if the sample were imaged without such pre-treatment and/or in a liquid, which is the medium of choice for imaging biological samples. The biological sample can be frozen using known techniques, for example, cryogenic techniques.

According to an embodiment of the first aspect, the shape of the tip of the at least one probe mounted on the cantilever is one of a conical shape and a wedge shape.

The use of differently-shaped tips for performing the analysis of the sample has corresponding advantages. An advantage associated to a conically-shaped tip is ease of access to undercut regions of the sample. An advantage associated to a wedge-shaped tip is the possibility to use it to remove a layer of the sample by "slicing" the layer.

According to an embodiment of a second aspect of the present invention, there is provided an analyzer for analysis of a sample comprising: a tip of at least one probe mounted on a cantilever to access a region of the sample; a sample remover configured to remove a sample material from the region that is accessed by the tip of the at least one probe mounted on the cantilever; and at least one sensor configured to sense a parameter associated to the removal of the sample material from the region of the sample accessed by the tip of the at least one probe mounted on the cantilever, the analyzer being operable to remove at least one layer of the sample.

An embodiment of the second aspect benefits from all the advantages of the first aspect.

According to an embodiment of the second aspect, comprising an array of probes mounted on the cantilever.

Features of one aspect of the present invention may be applied to any another aspect and vice versa.

BRIEF DESCRIPTION OF THE SEVERAL VIEWS OF THE DRAWINGS

Reference will now be made, by way of example, to the accompanying drawings in which.

Within the description, the same reference numerals and/or signs are used to denote the same parts or the like.

DETAILED DESCRIPTION OF THE INVENTION

Figure 1:
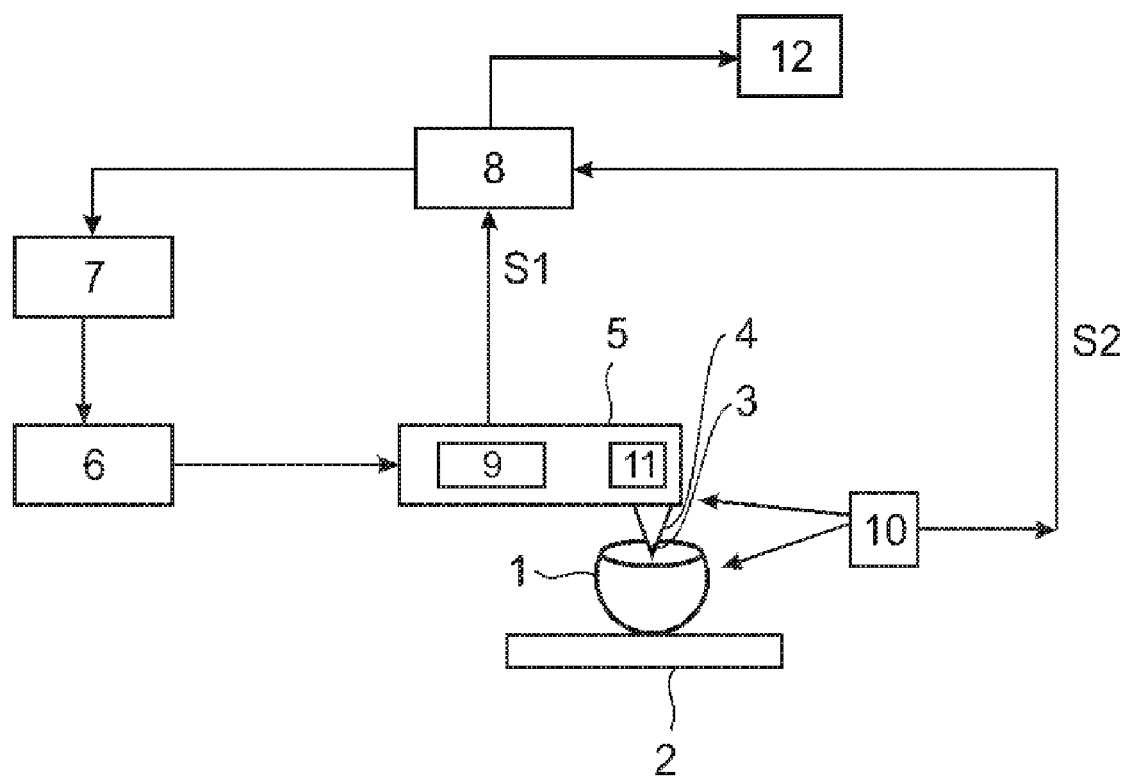
FIG. 1 illustrates the analyzer.

In the following, a description will be provided of the present invention through an embodiment of the present invention. However, the following embodiments do not restrict the invention in the scope of the invention and all combinations of features explained in the embodiment are not always essential to means of the invention for solving the problems.

As can be seen from FIG. 1, a sample 1 to be analyzed is mounted onto a substrate 2. A positioner 6 is used to position a tip 3 of at least one probe 4 mounted on a cantilever 5 relative to the sample 1. Specifically, the positioner 6 is used to bring the tip 3 into contact with a surface of the sample 1. In this way, the tip 3 accesses a region on the surface of the sample 1. A sample remover 11 is configured to remove a sample material from the region that is accessed by the tip 3. The sample remover 11 may be integrated into the cantilever 5 onto which the at least one probe 4 is mounted and/or may be provided as an external unit therefrom. At least one sensor 9, 10 is also provided in order to sense a parameter associated to the removal of the sample material as facilitated by the sample remover 11. The at least one sensor may be an integrated sensor 9 being integrated into the cantilever 5 or it could be an external sensor 10 being provided separately from the cantilever 5. A sensing signal S1 generated by the integrated sensor 9 and/or a sensing signal S2 generated by the external sensor 10 is conveyed to a processing unit 8, which processes these signals thereby to generate data that is transmitted to a data representation unit 12 where the data may be further manipulated and/or graphically represented. The processing unit 8 may be further configured to convey the sensing signal S1 generated by the integrated sensor 9 and/or the sensing signal S2 generated by the external sensor 10 to a controller 7, which uses these signals for controlling the positioner 6 and, by this, controlling the extent of contact between the tip 3 and the sample 1.

The positioner 6 is operated so as to scan the tip 3 of the at least one probe 4 mounted on the cantilever 5 relative to the sample 1. The sample remover 11 is operated to facilitate removal of the sample material at each scan point. The internal sensor 9 and/or external sensor 10 are operated to sense a parameter associated to the removal of the sample material at each such scan point and to generate a corresponding sensing signal S1, S2. In this way, the analyzer is operated to remove a whole layer of the sample 1. The process is then repeated for removal of subsequent layers of the sample 1. Mapping either or both of the sensing signals S1, S2 as a function of each scan point of the tip 3 on the sample 1 until a whole layer of the sample 1 is removed, repeating this for each subsequent layer that is removed and then combining the results obtained for all the layers of the sample 1 that are removed may be used to generate a three-dimensional image of the sample 1. Processing and manipulation of such results can be done in the processing unit 8 and graphically represented on the data representation unit 12. In this case, the processing unit 8 and data representation unit 12 may be incorporated in a computer and processing and manipulation of the results as described above may be done by running a computer simulation program on the computer.

The tip 3 of the at least one probe 4 mounted on the cantilever 5 can, for example, be of the type used for conventional AFM imaging. Such a tip can be used for accessing a localized region of the sample, such as, for example, an atom or molecule of the sample, which is then treated via the sample remover 11 to facilitate the removal of the atom or molecule from that region. By removing a layer of the sample 1 atom-by-atom or molecule-by-molecule in the above-described manner, repeating this for the removal of subsequent layers of the sample 1 and then combining the results obtained for all the removed layers yields a three-dimensional image of the sample 1 would provide information on the sample 1 on an atomic or molecular scale.

Of course, different shapes for the tip 3 may be used in the analyzer for performing the analysis of the sample 1 with each different shape of the tip 3 having an associated advantage. For example, a conically-shaped tip 3 may provide ease of access to undercut regions of the sample 1. An advantage associated to a wedge-shaped tip 3 is the possibility to use it to remove a layer of the sample 1 by "slicing" the layer.

It could be that removal of the sample material at each point of contact between the tip 3 and the sample 1, when the tip 3 is scanned relative to the sample 1, results in some debris on the surface thereof. In order that the debris does not interfere with, for example, scanning of the tip 3 to other points on the sample 1 and/or disrupting operation of the at least one sensor 9, 10 in sensing a parameter associated to the removal of the sample material, the debris is removed. Any appropriate device and/or method may be used in conjunction with the analyzer for removing the debris off the sample surface, for example, a specially-fabricated miniature fan can be used.

As mentioned earlier, the at least one sensor is an integrated sensor 9 that is integrated into the cantilever 5 or an external sensor 10. The integrated sensor 9 and/or the external sensor 10 senses a parameter associated to the removal of the sample material via the sample remover 11. Typically, the integrated sensor 9 performs this task by measuring a parameter of the cantilever 5 into which it is integrated. The integrated sensor 9 may be a vibration sensor to detect a change in vibration of the cantilever 9 in response to the removal of the sample material, a charge sensor to detect a change in a charge, for example, a surface charge, of the cantilever 9 in response to the removal of the sample material, a temperature sensor in order to detect a change in temperature of the cantilever 9 in response to the removal of the sample material or a combination of a vibration sensor, charge sensor and a temperature sensor. An advantage associated to the use of the combination is that the sensing signal of the sensor, which has a higher magnitude out of all the sensing signals that are produced by the sensors in the combination, may be used. A further advantage is that, if one of the sensors is not functioning, then the other sensors in the combination may be used. Of course, the analyzer is not limited to the use of the aforementioned sensors for the integrated sensor 9. Any other sensors may be used either independently or in combination to achieve the function of the integrated sensor 9.

Typically, the external sensor 10 senses a parameter of the sample 1 to sense the removal of the sample material. The external sensor 10 could be a smell sensor for sensing the smell associated to the gaseous phase of the sample once it is removed by, for example, heating, a mass-spectrometer, a pressure sensor for when the analysis is conducted in a vacuum or a combination of a pressure sensor, a smell sensor and a mass-spectrometer. The advantages associated to the use of the combination correspond to those stated for the use of a combination of sensors for the integrated sensor. Of course, the analyzer is not limited to the use of the aforementioned sensors for the external sensor 10. Any other sensors may be used either independently or in combination to achieve the function of the external sensor 10.

An alternative to using the integrated sensor 9 and/or the external sensor 10 for sensing the parameter associated to the removal of the sample material is to measure a mechanical response of the cantilever 5 to the removal of the sample material. Specifically, a deflection of the cantilever 5 can be measured. In this case, the deflection of the cantilever 5 can be measured by directing a laser beam on its surface disposed opposite to that on which the probe 4 is mounted and monitoring the displacement of the reflected laser beam on, for example, a quadrature-segmented photodiode. The difference in a magnitude of the laser beam as displaced on at least two of the segments of the quadrature-segmented photodiode may be used to measure the deflection of the cantilever 5.

Removal of the sample material from the region of the sample that is accessed by the tip 3 can be done heating the tip. The sample material is, in this case, "burnt off" or fragmented into a gaseous phase due to the energy transfer from the hot tip. Removal of the sample material can, in this case, be facilitated by the sample remover 11 being a heater that is integrated into the cantilever 5 onto which the probe 4 associated to that tip 3 is mounted. In order to supplement the measurements obtained from the aforementioned internal sensor 9 and external sensor 10, a parameter of the sample remover 11 can be measured in response to the removal of the sample material. In this case, the parameter that is measured is the change in temperature of the integrated heater in response to the removal of the sample material.

Where removal of the sample material is effected by application of heat via the tip 3, the heat being applied to the tip 3, for example, via the sample remover 11 being an integrated heater, the removal of a layer of the sample material may be done via a predetermined number of steps. These steps may be defined by the number of scan points for scanning the tip 3 relative to the sample 1. In this case, the heat applied to the tip 3 could be configured to increase with each scan point as it may be that some regions of the sample 1 may require more heat than others for removal thereof. Before removal of the next layer in the above-described manner, a spring constant of the cantilever 5 may be switched to another value. By simultaneously repeating the above-described heat treatment and, for example, measuring the deflection of the cantilever 5 at each scan point for each of the spring constant values of the cantilever 5, additional information on the removal process of the sample material can be obtained.

Although the removal of the sample material as facilitated by the sample remover 11 has been described above in relation to the independent use of the integrated sensor 9, the external sensor 10, measuring the deflection of the cantilever 5 onto which the at least one probe 4 is mounted and measuring the temperature of the integrated heater 11, they can be used in combination for this purpose. An advantage associated to the combination is that the sensitivity of the measurements can be increased. Also, if one of the sensors malfunctions, the other sensors in the combination can be relied upon. Furthermore, if, for example, the cantilever 5 has a spring constant value that makes it stiff and, therefore, insensitive, than the other sensors in the combination can be used.

The analyzer can be applied for three-dimensional analysis of biological samples. In this case, the biological sample 1 would preferably be frozen prior to performing the analysis for ease of accessing a region on it by the tip 3 since biological samples are known to have irregular surfaces and also so that a specialized servo-system is not required, which would be the case if the sample 1 were imaged without such pre-treatment and/or in a liquid, which is the medium of choice for imaging biological samples. Known cryogenic techniques may, for example, be used to freeze the biological sample 1.

Of course, the analyzer is not restricted to obtaining three-dimensional information of only biological samples. For example, the sample 1 may be a metal or metal-containing substrate. In this case, the sample remover 11 would preferably be configured to apply an electric field to the tip 3 of the at least one probe 4 mounted on the cantilever 5 so as to remove material at the point of access on such a sample 1 by the tip 3.

Although the analyzer has been described with reference to the use of at least one probe 4 mounted on a cantilever 5, a cantilever 5 with an array of probes 4 mounted thereon can also be used.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method for analysis of a sample comprising:

accessing a region of the sample via a tip of at least one probe mounted on a cantilever, wherein the shape of the tip of is one of a conical shape and a wedge shape;

removing a sample material from the region that is accessed by the tip of the at least one probe mounted on the cantilever, wherein the sample material is one of an atom of the sample and a molecule of the sample, wherein removal of the sample material is selected to be performed by heat applied to the tip of the at least one probe mounted on the cantilever, and wherein the heat applied to the tip of the at least one probe mounted on the cantilever is selected to be performed by an integrated heater that is integrated into the cantilever onto which the at least one probe is mounted;

sensing a parameter associated to the removal of the sample material in the removing operation, wherein sensing of the parameter associated to the removal of the sample material is selected to be done by a combination of an integrated sensor that is integrated into the cantilever onto which the at least one probe is mounted, an external sensor, measuring a deflection of the cantilever onto which the at least one probe is mounted and measuring the temperature of the integrated heater, wherein the integrated sensor comprises one of: a vibration sensor, a charge sensor, a temperature sensor and a combination of a vibration sensor, a charge sensor and a temperature sensor, and wherein the external sensor comprises one of: a pressure sensor, a smell sensor, a mass-spectrometer and a combination of a pressure sensor, a smell sensor and a mass-spectrometer; and removing debris from a surface of the sample, the debris resulting from the removal of the sample material in the removing operation from the region that is accessed by the tip of the at least one probe mounted on the cantilever; and wherein the accessing, removing and sensing operations are repeated to facilitate removal of at least one layer of the sample, wherein the at least one layer of the sample is removed via a predetermined number of steps, the heat applied to the tip of the at least one probe mounted on the cantilever being increased at each step relative to the previous step until the predetermined number of steps are completed, and wherein a spring constant value of the cantilever onto which the at least one probe is mounted is switched to another spring constant value before the at least another layer of the sample is removed;

wherein the accessing, removing and sensing operations are repeated to facilitate removal of at least another layer of the sample; and wherein the sample is a biological sample which is frozen prior to the accessing operation being performed.

* * * * *